(12) United States Patent
LeBlanc (10) Patent No.: US 12,486,951 B2
(45) Date of Patent: Dec. 2, 2025

(54) TANK COLLAR FOR PRESSURIZED TANK

(71) Applicant: DITECH TANK HOLDING COMPANY, INC., Saint John (CA)

(72) Inventor: Daniel LeBlanc, Scoudouc (CA)

(73) Assignee: DITECH TANK HOLDING COMPANY, INC., Saint John (CA)

( * ) Notice: Subject to any disclaimer, the term of this patent is extended or adjusted under 35 U.S.C. 154(b) by 0 days.

(21) Appl. No.: 18/600,653

(22) Filed: Mar. 9, 2024

(65) Prior Publication Data
US 2024/0288126 A1 Aug. 29, 2024

Related U.S. Application Data

(62) Division of application No. 17/062,179, filed on Oct. 2, 2020, now Pat. No. 11,988,335.

(51) Int. Cl.
*F17C 13/06* (2006.01)
*F17C 13/00* (2006.01)

(52) U.S. Cl.
CPC .... *F17C 13/002* (2013.01); *F17C 2201/0109* (2013.01); *F17C 2201/032* (2013.01); *F17C 2205/018* (2013.01)

(58) Field of Classification Search
CPC ............ F17C 13/002; F17C 2201/0109; F17C 2201/032; F17C 2205/018; F17C 2205/0308; F16K 27/12; F16K 35/10
USPC .................................. 220/582, 724; 137/382
See application file for complete search history.

(56) References Cited

U.S. PATENT DOCUMENTS

| 8,720,738 B1* | 5/2014 | Ryman ..................... F17C 13/06 220/724 |
| 2011/0140412 A1* | 6/2011 | Manser ................. F17C 13/084 285/192 |
| 2021/0062975 A1* | 3/2021 | de Oliveira ........... F17C 13/084 |

* cited by examiner

*Primary Examiner* — Don M Anderson
*Assistant Examiner* — Elizabeth J Volz
(74) *Attorney, Agent, or Firm* — C. Brandon Browning; Maynard Nexsen PC (57) ABSTRACT

Disclosed is a collar for mounting on a top portion of a pressurized tank. The collar comprises: a body, a fastening system and a rotatable lid disposed on the collar. Further provided is a collar with a window cut-out for viewing tank data and a regulator mounting clip for securing a regulator of the tank in place during use.

7 Claims, 14 Drawing Sheets

TANK COLLAR FOR PRESSURIZED TANK

CROSS-REFERENCE TO RELATED APPLICATIONS

The present application is a divisional patent application of U.S. patent application Ser. No. 17/062,179, filed on Oct. 2, 2020, the content of which is expressly herein incorporated by reference in its entirety.

TECHNICAL FIELD

The present disclosure provides a foot ring and collar for a pressurized tank.

BACKGROUND

Upright pressurized tanks are known in the art and are often used for backyard barbeques, although such tanks can be used for industrial applications or for heating homes. The latter tanks are relatively large and can hold over 100 gallons of fuel. Tanks that are vertically upright conventionally comprise a metal foot ring that provides stability for the tank and raises the bottom portion of the tank off the ground. The metal foot ring ensures that the tank stands in an upright and level position while also keeping the body of the tank from contacting the ground. Preformed plastic supports for propane tanks have been described in the art. Such preformed supports are designed to receive the existing metal foot ring on the bottom of a tank and provide additional support to stabilize the tank or to reduce rust formation on a surface on which the tank rests. However, existing designs may not provide sufficient support to bear the weight of the tank, particularly for large tanks for industrial or home heating applications. Further, the metal foot ring may still be prone to rust due to water accumulation arising from condensation on the tank or from the elements. This a particular concern for large tanks for home heating or industrial use that are stored outside and not enclosed in a grill housing as is the case with most backyard barbeque tanks.

U.S. Pat. No. 7,726,620 discloses a vertical fuel tank support system. The support system is specifically designed to fit an existing metal ring welded to the bottom of a propane tank. The support system has a support pad including an internal cavity with ribbing reinforcements. The support pad is of a circular configuration to match the shape of the metal ring of the propane tank and the support system provides a base upon which the tank rests. Conventional pressurized tanks also comprise top mounted metal collars to protect valves and regulators disposed in the top portion of the tank from damage. Such collars also typically comprise handles for convenient handling of the tank by a user. However, such collars are also prone to corrosion and additionally may not adequately protect the enclosed valves and regulators from the environment. While barbeque tanks are often protected within an enclosure within the barbeque structure itself, tanks exposed to the elements, such as those used to heat homes or for industrial application may suffer from corrosion of such components.

U.S. Pat. No. 8,720,738 describes a plastic lid that fits over an existing metal collar on a propane tank. The existing lid assembly is attached to the tank by drilling small holes in the metal collar and attaching an adaptor to the collar by bolts. The adapter is attached to a vertical side plate of the lid assembly with a cotter pin. The lid opens and closes by rotating about the cotter pin. However, the existing collar is made of metal and so is still prone to corrosion. The present disclosure seeks to address one or more of the above-described shortcomings or to provide useful alternatives to known tank foot ring and collar designs.

SUMMARY

The present disclosure provides a foot ring made of polymeric material, such as plastic composite, for supporting a bottom portion of a pressurized tank.

In one embodiment, the foot ring provides for improved drainage of water that may collect around the base of the tank due to wet environment conditions or condensation formation. In such embodiment, the foot ring body comprises an open end on which the bottom portion of the tank rests and that defines a hollow space or spaces. An opposing side of the foot ring body provides a surface for contact with a ground surface and that comprises drainage openings. According to such embodiments, any water that accumulates on the bottom of the tank can flow through the hollow space or spaces and exit the bottom of the foot ring through the drainage openings. Such configuration consequently reduces water build up around the tank bottom and thereby reduce corrosion.

Thus, according to one aspect of the disclosure, there is provided a tank foot ring comprising: a body for supporting a pressurized tank made of polymeric material; and the body having an open end enclosing a hollow space or spaces on which a bottom portion of the pressurized tank rests and wherein the open end is in air flow communication with such hollow space or spaces. The body further comprises an opposing surface for contacting a ground surface on which the foot ring rests, the opposing surface having a series of openings for drainage of water from the hollow space or spaces when the foot ring is in use.

In another embodiment, the foot ring replaces a standard metal foot ring conventionally used to stabilize pressurized tanks. In another embodiment, the foot ring is attachable to the tank by a releasable fastening system comprising tabs that are bolted to the foot ring or other suitable fastener systems.

According to alternative embodiments, the foot ring provides enhanced structural support for stabilizing large tanks for industrial use or for heating homes. According to certain embodiments, the foot ring comprises an annular ring and radial rib members extending therefrom and that converge at a central region or point in the foot ring. Further advantageous embodiments are disclosed herein.

Thus, according to a further aspect, there is provided a tank foot ring comprising: a body for supporting a pressurized tank of a type that does not have a bottom mounted metal ring; the body of the foot ring having an end on which a bottom portion of the pressurized tank rests when in use, and an opposing surface for contacting a ground surface on which the foot ring rests; wherein the foot ring is made of polymeric material; and the body being releasably attachable directly to the bottom portion of the pressurized tank.

A tank collar is also disclosed that is releasably attachable to the top portion of an upright pressurized tank. Similar to the foot ring, the collar replaces a standard metal collar conventionally used to protect valves in the top portion of the tank and is made of composite plastic or other rust-resistant materials, thereby avoiding tank corrosion. The collar comprises a lid that fits on the collar body and that actuates between an open position and a closed position to protect valves, regulators and/or other components disposed in the top portion of the tank from damage from the elements or handling. The collar comprises a fastening system for releasably attaching the collar body to the top portion of the tank.

The collar may further comprise a window cut-out portion for receiving the fastener member, such as a tab. In such embodiment, the fastening member comprises data relating to the tank and wherein the data is viewable through the window cut-out. In another embodiment, the collar further comprises a regulator mounting bracket attachable to the collar for securing a regulator of the tank in place during use.

DETAILED DESCRIPTION

Figure 1:
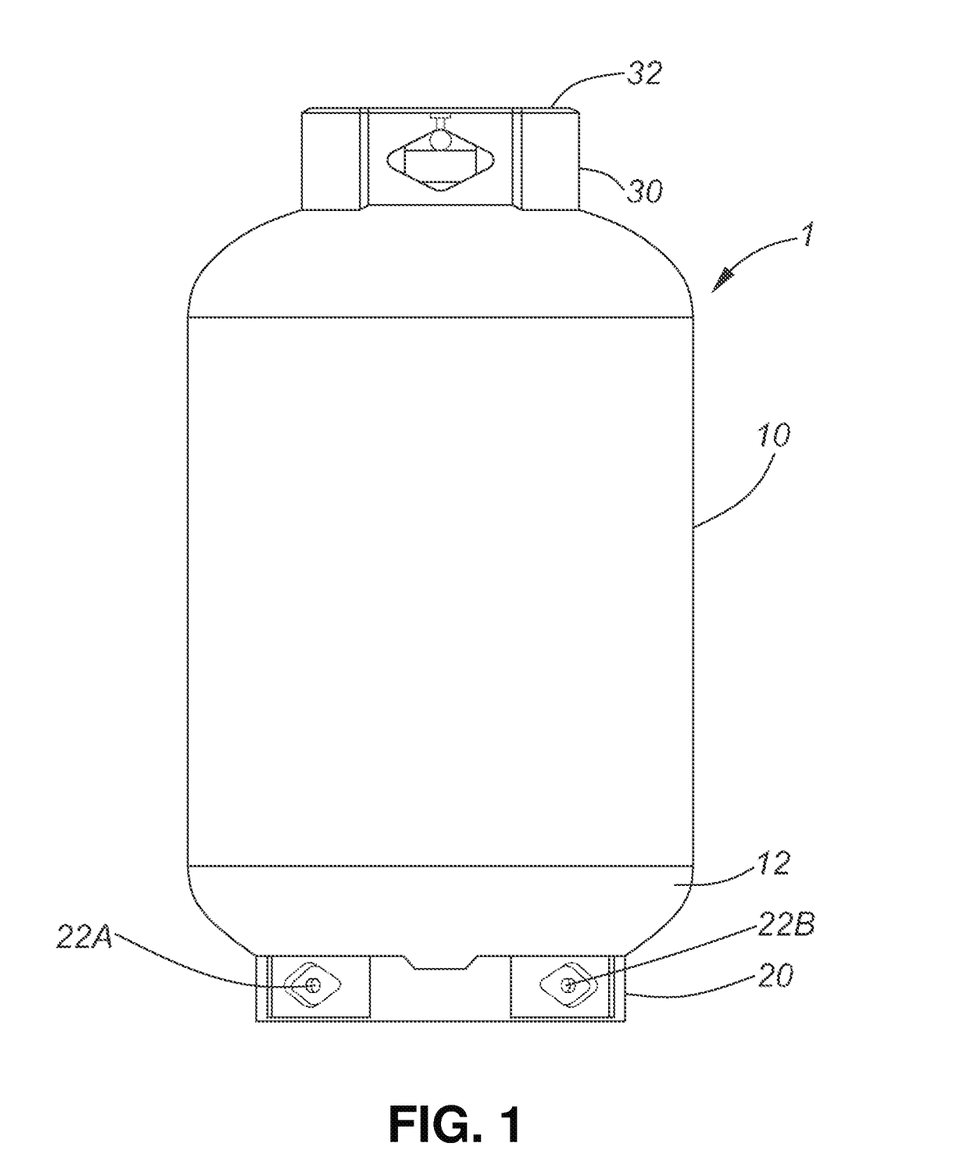
FIG. 1 shows a pressurized fuel tank of the upright type having a collar and a foot ring according to one embodiment.

FIG. 1 shows a pressurized propane tank 1 of the upright type used to store compressed fuel for use in industry or to heat a home. The body 10 of the tank 1 depicted in the embodiment shown in FIG. 1 can hold about 123 gallons or 420 lbs of propane and thus is significantly larger than the type of pressurized tank often used for backyard barbeque grills. Mounted on the bottom portion of the tank 1 is a foot ring 20 that is detachable from the tank by bolts 22A and 22B. The foot ring 20 provides a stable support for the tank 1 as described in detail below (in connection with FIGS. 2A and 2B). Suitable construction material for the foot ring 20 is composite plastic or other rust-proof polymeric material.

The top portion of the propane tank 1 comprises a detachable plastic composite collar 30 having a lid 32 that pivots between open and closed positions as described below. (See FIG. 5A and FIG. 5B). The composite collar 30 protects valves formed in the top portion of the tank 1 from the elements or from being damaged during handling of the tank 1.

Figure 2:
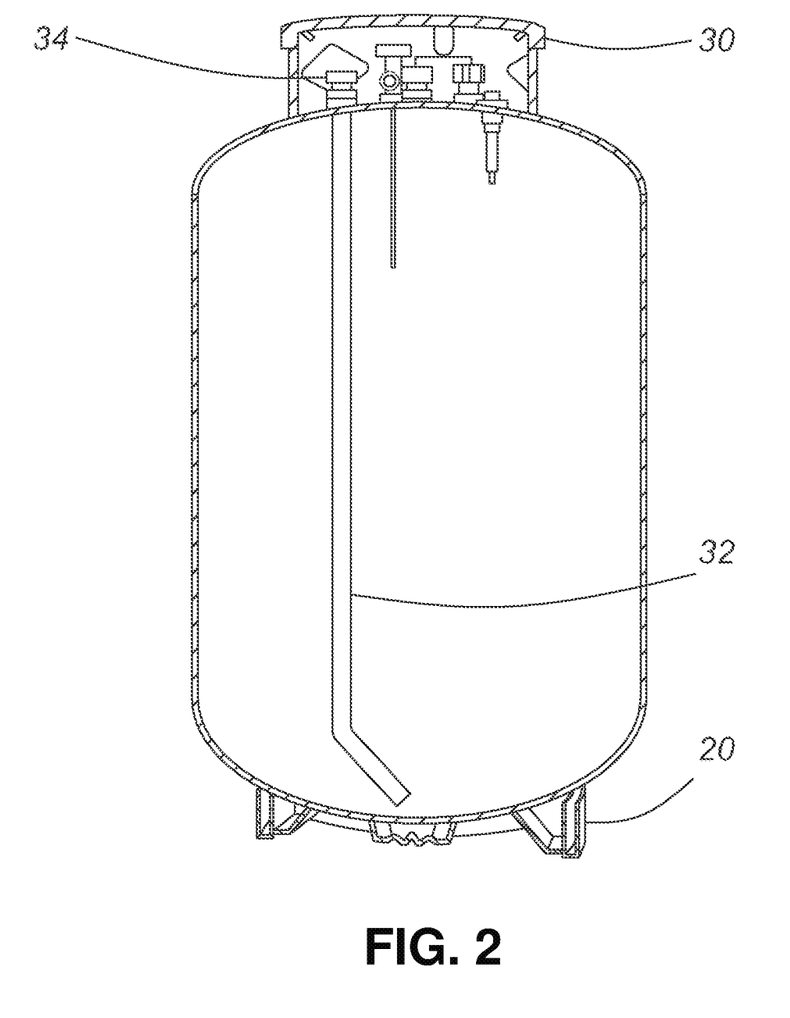
FIG. 2 is a cross section of the fuel tank having the collar and foot ring.

FIG. 2 is a 3D cross-sectional view of the propane tank 1 shown in FIG. 1 with the bottom mounted foot ring 20 and the top mounted collar 30. The internal components are standard and include a liquid withdrawal dip tube 32, a liquid withdrawal valve 34, among other standard components that are omitted from the discussion for brevity.

FIGS. 3A, 3B, 3C and 3D depict the foot ring 20 in more detail. As can be seen in FIGS. 3A-D, the foot ring 20 comprises a body 23 having an annular portion 24 comprising an outer vertical wall 36, inner vertical wall 38 and a base wall 40 that defines an internal hollow space 50. The distal ends of outer vertical wall 36 and inner vertical wall 38 abut the bottom portion of the tank 1 (excluding cut-out regions described below). Extending inwardly and upwardly from inner wall 38 is an inwardly angled wall 42. The inwardly angled wall 42 comprises a first wall portion 42A formed on the inner wall 38 and that extends at an angle of about 90 degrees therefrom and a second wall portion 42B that extends from the first wall portion 42A at an angle of about 45 degrees as measured from the vertical inner wall 38. The angled wall 42 is included for added structural support and defines the internal annular hollow space 50 in the annular portion 24 (see FIGS. 3A and 3D).

Figure 3A:
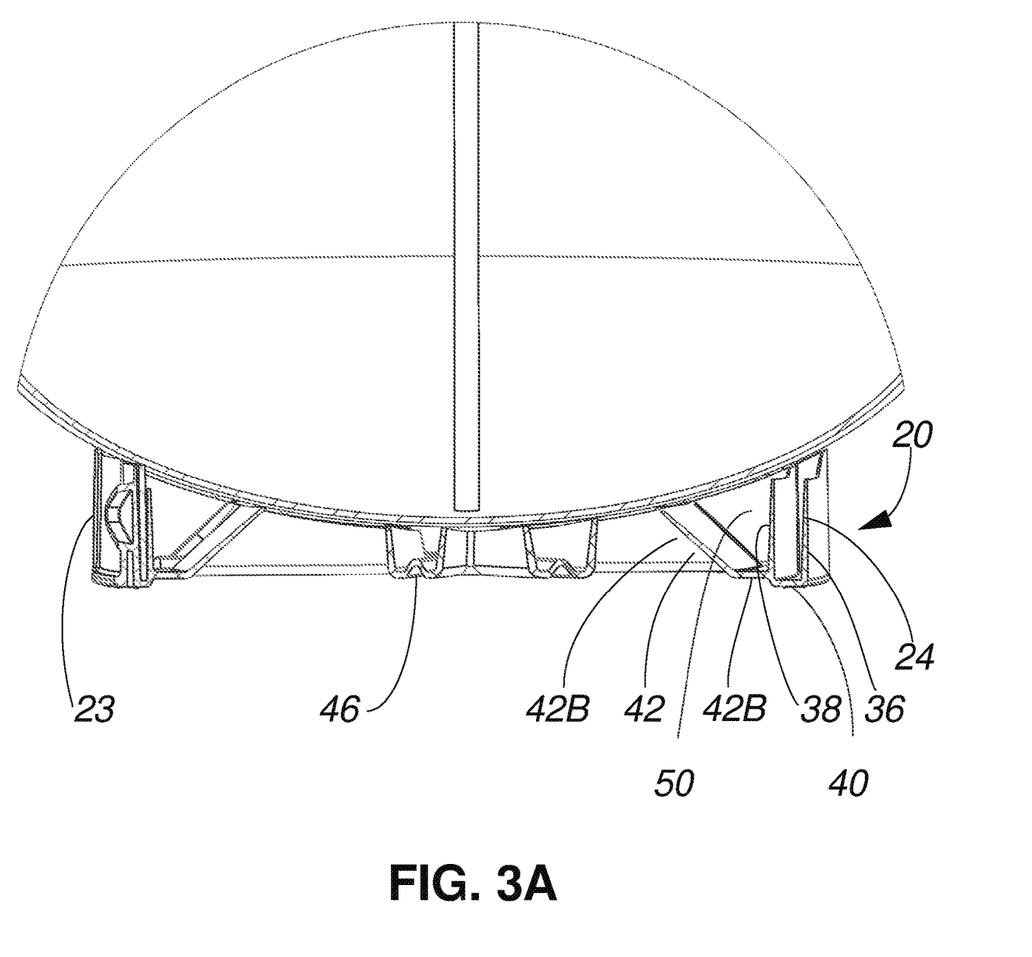
FIG. 3A is a cross-section of the foot ring.
Figure 3B:
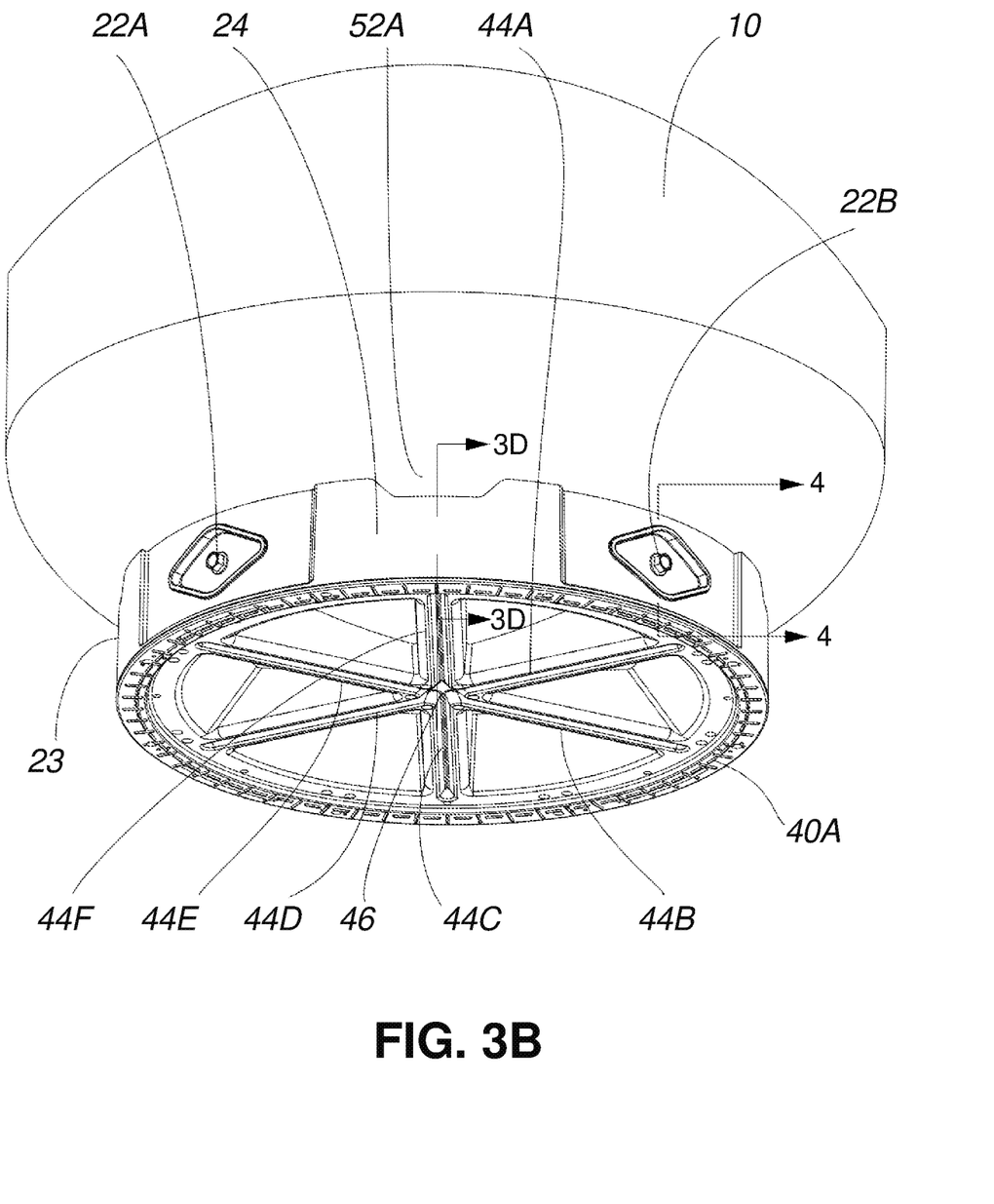
FIG. 3B is a three-dimensional elevational view of the foot ring.
Figure 3C:
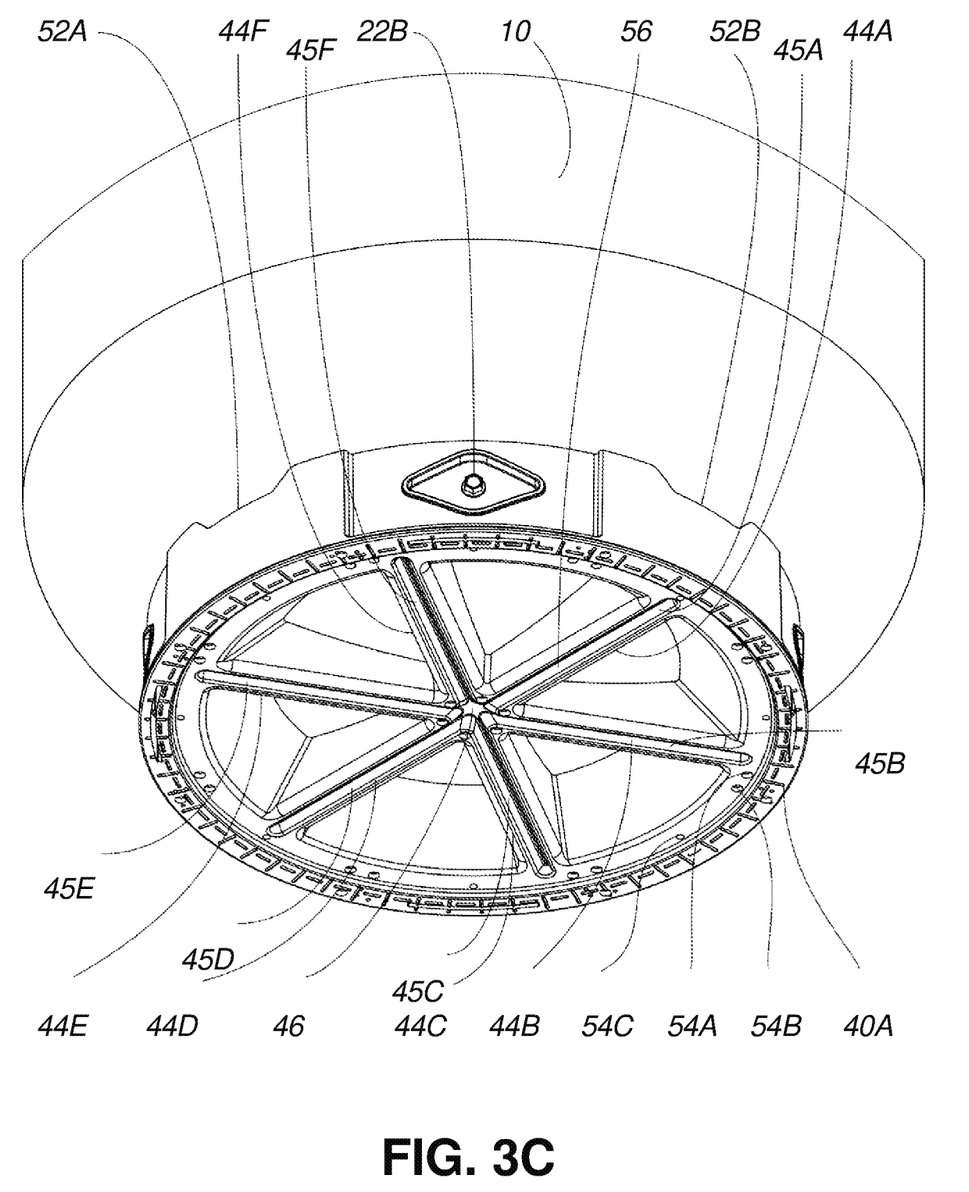
FIG. 3C is another three-dimensional elevational view of the foot ring.

The foot ring body 23 also includes six rib members 44A, 44B, 44C, 44D, 44E and 44F that extend radially inwardly from the annular portion 24 and converge at a central region 46 as best shown in FIG. 3B and FIG. 3C. The base wall 40 (see FIG. 3A) of the hollow annular portion 24 and the bottom walls of the plurality of rib members 44A, 44B, 44C, 44D, 44E and 44F together provide a stable surface on which the bottom portion of the foot ring that contacts the ground or other surface on which the foot ring 20 rests. As shown in FIG. 3C, each rib member 44A, 44B, 44C, 44D, 44E and 44F comprises one of a respective longitudinal groove 45A, 45B, 45C, 45D, 45E and 45F formed in its bottom wall that provides traction against the ground on which the foot ring 20 rests. Such grooves also minimize surface contact with the ground to aid in the drainage of water from the internal space. The grooves are best shown in FIG. 3C A series of circumferentially spaced-apart drainage openings are formed in the annular portion 24. Three of such drainage openings 54A, 54B and 54C are shown in FIG. 3C. Central drainage openings 56 are formed in a region where the rib members 44A, 44B, 44C, 44D, 44E and 44F converge.

Traction is also provided by depressions and/or protrusions formed on the side of the annular ring that contacts a surface on which the foot ring is placed to reduce slippage of the tank foot ring when in use. In the embodiments shown in FIGS. 3B and 3C, a series of depressions 40A are formed annularly on the outer surface of base wall 40. In the embodiment shown, the depressions 40A are indentations that form a cross-hatched pattern.

The foot ring 20 is releasably attachable to the bottom portion of the tank 1. Unlike prior designs, the attachment described in this embodiment does not accommodate an existing metal foot ring. The fastening system is shown in FIG. 3D and FIG. 4.

An example of a suitable releasable attachment is through circumferentially spaced metal tabs welded on the bottom surface of the tank 1. In this example, the tank 1 has four tabs spaced circumferentially around the tank base. An example of one of such tabs is shown in FIG. 3D and FIG. 4 as tab 58. FIG. 3D shows a cross-sectional view of the foot ring taken along rib member 44F of FIG. 3B. In particular, the sectional line runs through the groove 45F of rib 44 as indicated in the drawing. FIG. 4 is a similar cross-section but taken along a line that passes through a region of annular portion 24 having a bolt 22A that secures the foot ring 30 to the base of the tank 1.

Figure 4:
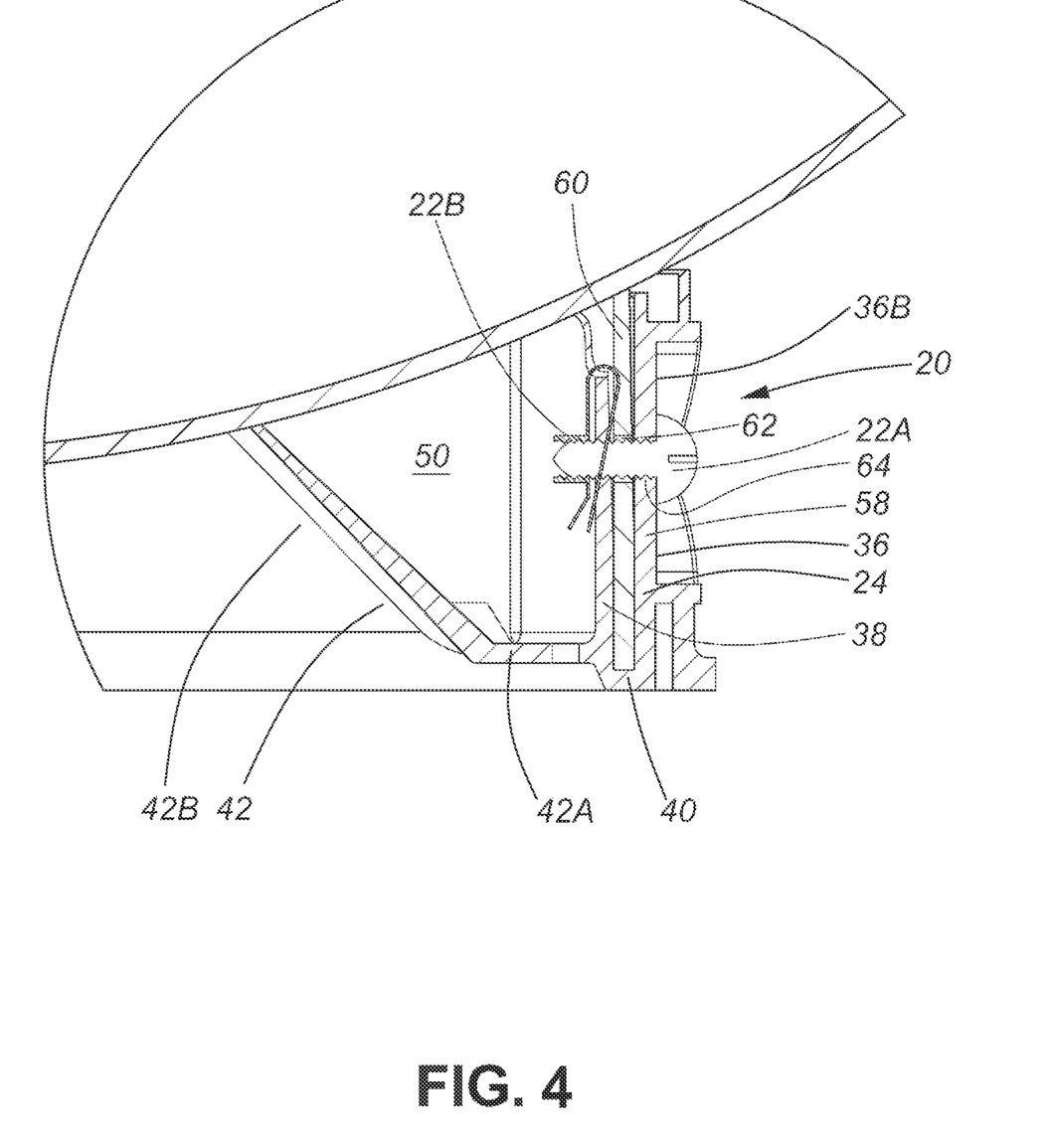
FIG. 4 is a cross section of the foot ring showing a fastening system according to one embodiment.

As shown in FIG. 4, the tab 58 shown fits into a corresponding internal slotted region 60 formed in the annular portion 24 of the foot ring 20. The tab 58 and outer vertical wall 36 of the annular portion 24 comprise respective openings 64 and 62 which, when aligned, receive the bolt 22A for fastening the foot ring onto the bottom of the tank 1. The bolt 22A threads into a clip-on barrel nut shown as 22B (FIG. 4). Such clip-on nuts have a barrel with multiple threads for secure thread engagement with the bolt 22A. In one embodiment, a black-phosphate finish is used on the nut 22B that enhances corrosion resistance. Such nuts are commercially available from McMaster-Carr® in Cleveland, Ohio. However, other suitable fasteners known to those of skill in the art can be employed to secure the foot ring 20 onto the base of the tank 1.

Figure 3D:
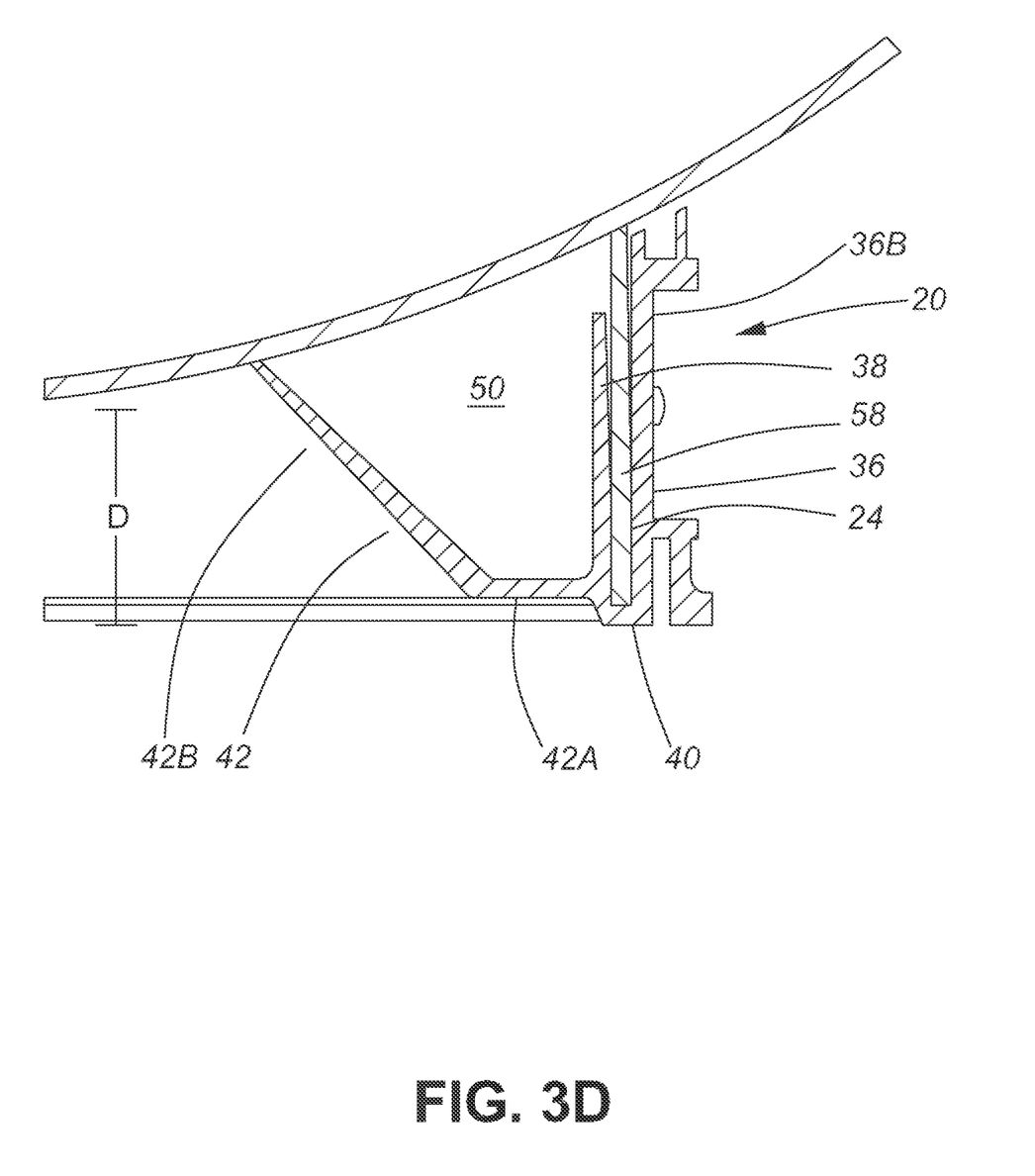
FIG. 3D is a cross section of the foot ring taken along the line of FIG. 3B.

As shown in FIG. 3D, the rib member 44F has sufficient depth D so that, when in use, a side wall adjacent to groove 45F of the rib member 44F contacts a respective ground surface, thus providing added structural support to the foot ring 20 for bearing and distributing the weight of the tank. The remaining ribs 44A, 44B, 44C, 44D and 44E are configured in a similar manner to distribute weight radially around the foot ring 20. FIG. 3D is taken through a line running through a groove in the rib and so D in the drawing is of a length that corresponds to a length measured from the bottom of the tank to a portion of the rib 44F that touches the ground when the foot ring 20 is in use.

Further, since the side of the foot ring 20 contacting the tank 1 is open or otherwise free of enclosing walls, the hollow spaces formed by the rib members 44A, 44B, 44C, 44D, 44E and 44F and hollow spaces 48 and 50 of the annular ring portion 24 are in air flow communication with the bottom portion of the tank 1. In addition, the upper portion of the outer wall 36 of foot ring 20 comprises spaced recessed portions 52A and 52B (FIG. 3C). Such a configuration provides enhanced air flow around the bottom portion of the tank 1 to reduce or prevent water build-up, which can in turn reduce or eliminate rust formation. Further, any water from the environment or condensation that builds up on the bottom portion of the tank 1 can pass through such hollow spaces 48 and 50 and through the series of drainage holes 54A, 54B, 54C that are provided in the annular portion 24 and central drainage holes (e.g. 56 in FIG. 3C) formed in a region where rib members 44A, 44B, 44C, 44D, 44E and 44F converge. Removal of water in this manner is advantageous in that it can prevent rust on the bottom of tank 1 that would otherwise occur with build-up of liquid within the hollow regions 48, 50.

Figure 5A:
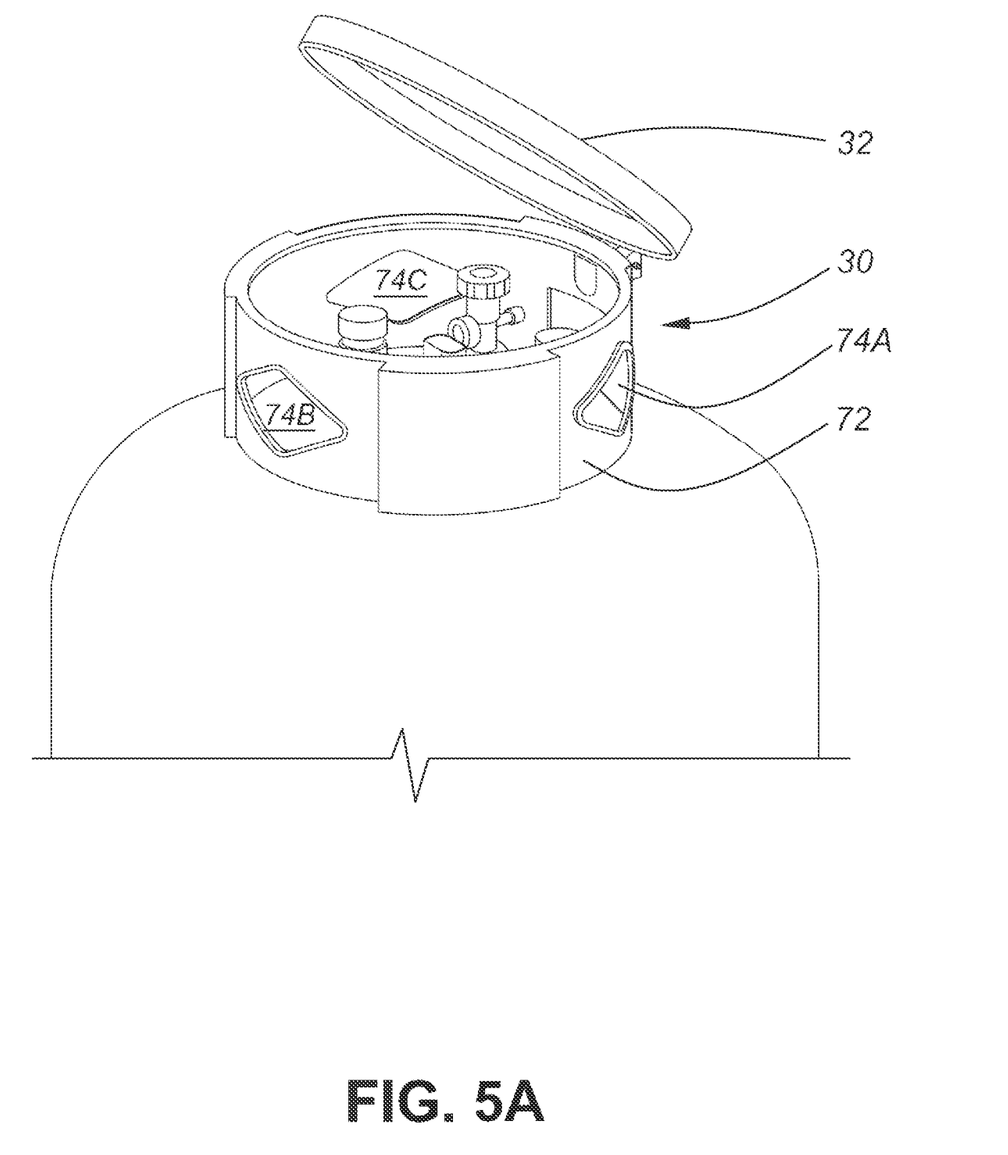
FIG. 5A shows the collar mounted on the tank in an open position.
Figure 5B:
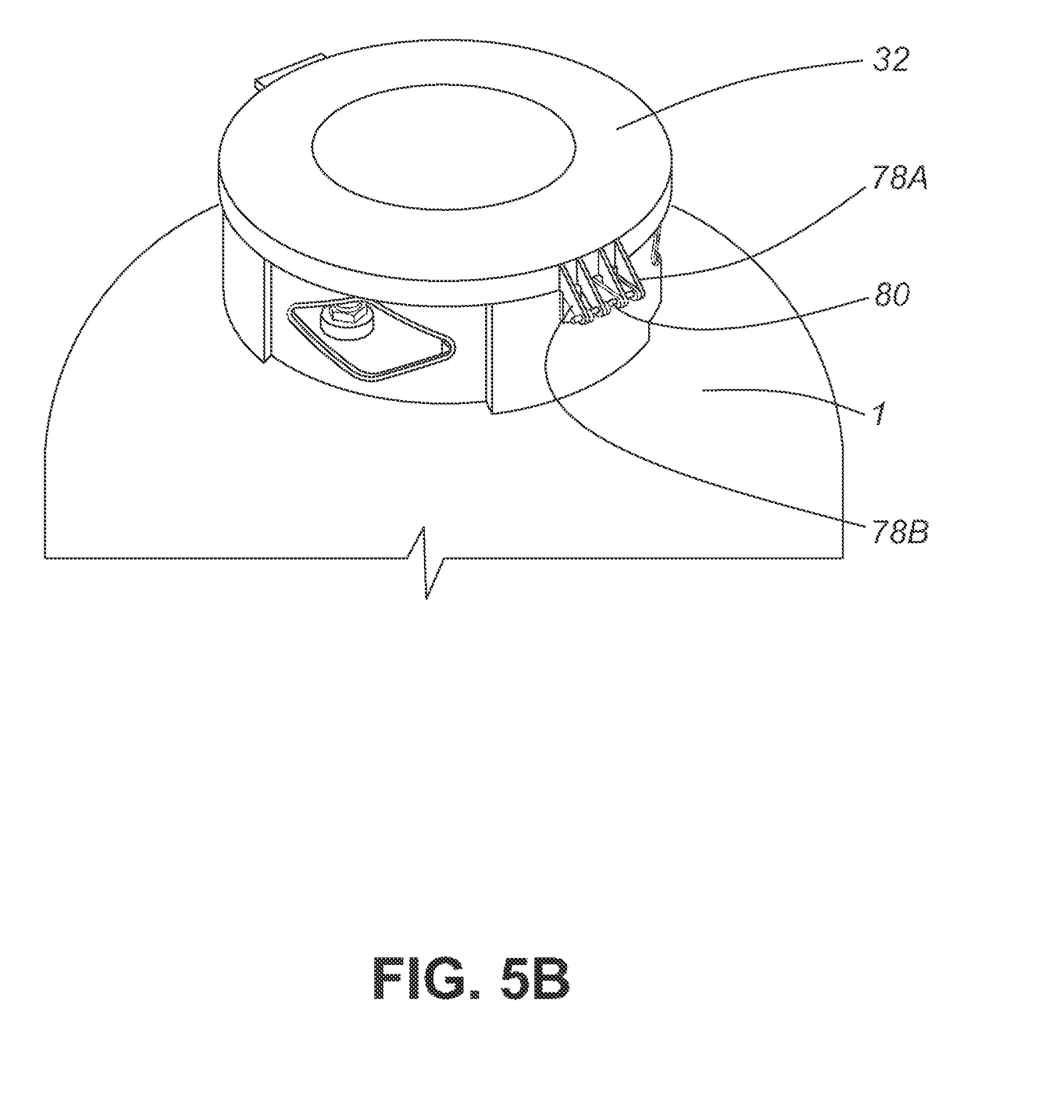
FIG. 5B shows the collar mounted on the tank in a closed position.

Turning now to FIG. 5A, there is shown a tank collar 30 for mounting on the top portion of an upright pressurized tank 1. The tank 1 shown in this embodiment can hold about 123 gallons or 420 lbs of propane and thus is significantly larger than the type of pressurized tank often used for barbeque grills. Such tanks 1 are often stored outside and thus require extra protection from the elements relative to typical backyard barbeque tanks.

The tank collar 30 has a body 72 shown with cut-out regions 74A, 74B and 74C to permit air-flow therethrough. The lid 32 is rotatably attached to the body 72 of the tank collar 30. Formed on a side wall of the lid 32 is a lid coupling member 78A having a longitudinal hole to receive a pin 80. A corresponding body coupling member 78B is formed on the body 72 of the collar 30 and fits partially inside the lid coupling member 78A. A longitudinal hole formed in the body coupling member 78B aligns with the hole in the lid coupling member 78A and when aligned receives the pin 80 about which the lid 32 rotates.

The tank collar 30 is attached to the top portion of the tank 1 with a series of tabs welded to the top of the tank that lock into corresponding clips formed in the body 72 of the collar 30.

Figure 6A:
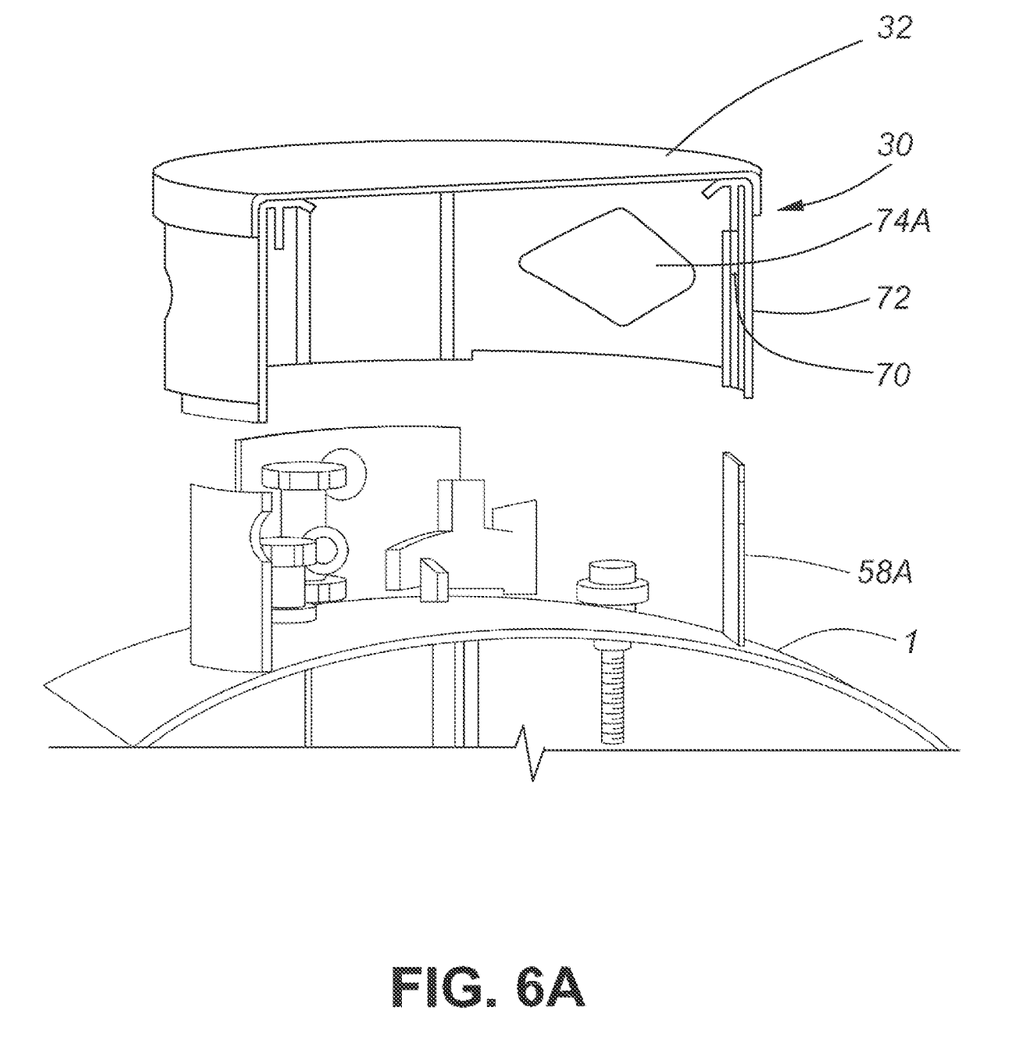
FIG. 6A shows an internal fastening system in three-dimension for mounting the collar on the tank according to one embodiment.
Figure 6B:
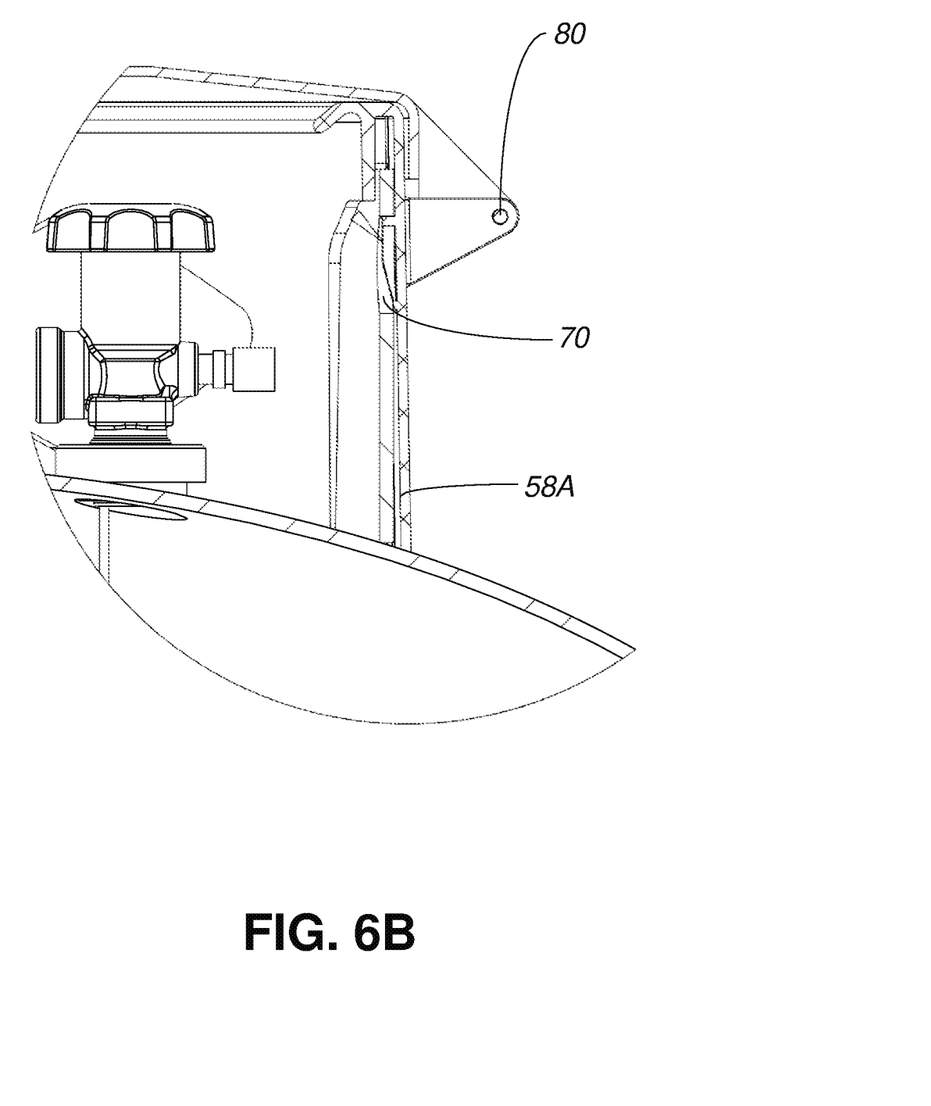
FIG. 6B shows a cross-section of the internal fastening system.

FIG. 6A is a three-dimensional view of the tank collar 30 showing its releasable attachment to the top of the tank 1. The tab 58A is shown formed on the top of the tank (secured by welding) and is one of three tabs that are arranged in spaced, circumferential relation on the top of the tank 1. The tab 58A fits into a clip element 70 including recessed portion 70 formed in a side wall of the tank collar 30. FIG. 6B is a cross-section of the collar, showing the tab 58A and the clip 70 in which the tab 58A fits. The clips enable a simple, releasable attachment of the collar 30 to the tank and does not require fasteners, such as screws, bolts or the like, to lock the collar snugly in place. This also reduces the number of components that are exposed to the elements and that can be subject to corrosion and require replacement. Thus, the collar clipping mechanism described herein facilitates ease of use and reduces maintenance costs.

Figure 7A:
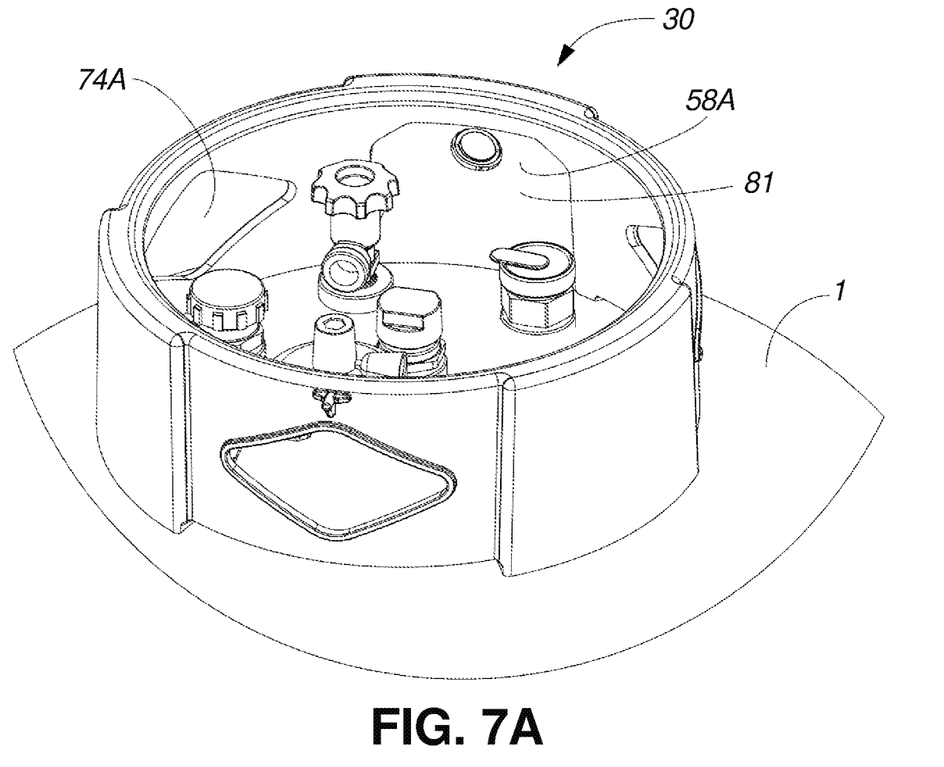
FIG. 7A shows a window cutout region in the collar in three-dimension for viewing data etched on a tab according to one embodiment.

FIG. 7A shows an alternative embodiment in which tab 58A comprises data relating to the tank. In such embodiment, the collar 30 comprises a window cut-out region 81 allowing viewing of data provided on tab 58A. Such a data may provide information about the tank 1 that is required by regulators for the tank to be serviced.

Figure 7B:
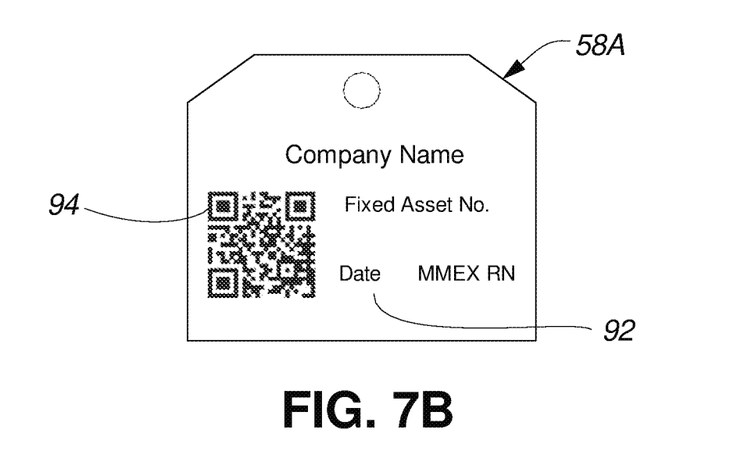
FIG. 7B shows data etched on the tab.

FIG. 7B provides non-limiting examples of such data and includes data 92 concerning the date and identifier information as well a quick response (AR) scan code 94. Other information may be included on the tab 58A as required. The data may be etched on the tab 58A by laser etching or by other suitable techniques known to those of skill in the art.

Protection of the data on tab 58A by the enclosed tank collar 30 is advantageous as data etched on metal components exposed to the elements can corrode and prevent to the data from being legible. Thus, protection of the data by placing it on an enclosed tab 58A can avoid costly replacement of components comprising tank data. As used herein, the term "data" includes textual information and/or numerical information relating to characteristics or properties of the tank. Without limitation, such data may include information that is required by regulators.

Figure 8A:
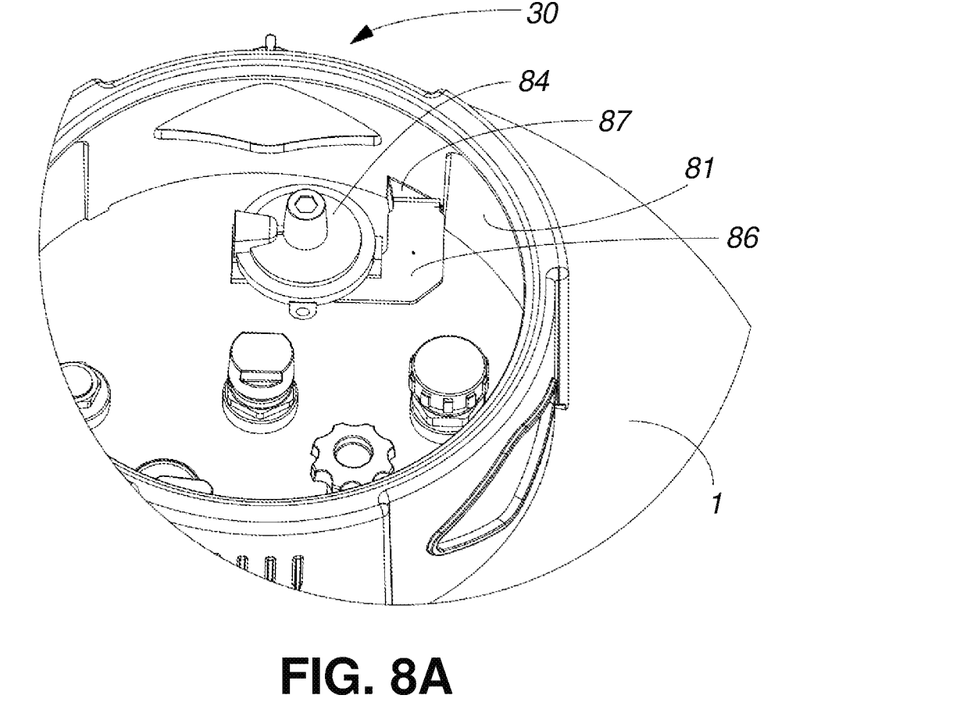
FIG. 8A shows a regulator mounting bracket secured on the tank within the collar for holding a regulator in place.

Moreover, in another embodiment, as shown in FIG. 8A, the collar 30 comprises a built-in regulator mounting member shown herein as a mounting bracket 86. The regulator mounting bracket 86 holds a regulator 84 in place on tank 1 and is protected from the elements by the enclosed space in the collar 30.

Figure 8B:
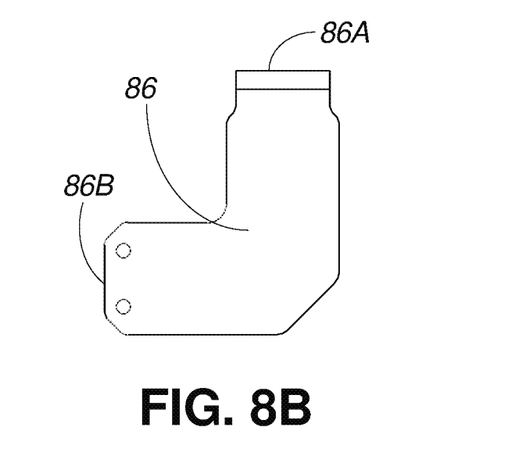
FIG. 8B is top plan view of the mounting bracket.
Figure 8C:
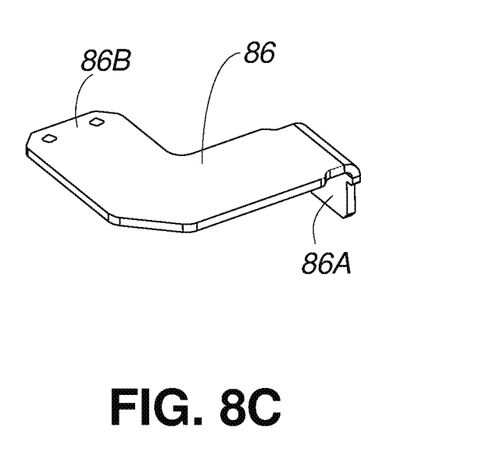
FIG. 8C is a three-dimensional side elevation view of the mounting bracket.

FIGS. 8B and 8C show various views of mounting bracket 86, including a top plan view (FIG. 8B) and a side elevational view (FIG. 8C). At a first end 86A, the regulator mounting bracket 86 fits into a pocket 87, which is disposed on the tank collar 30. The opposing end 86B of mounting bracket 86 clips onto the regulator 84.

Figure 8D:
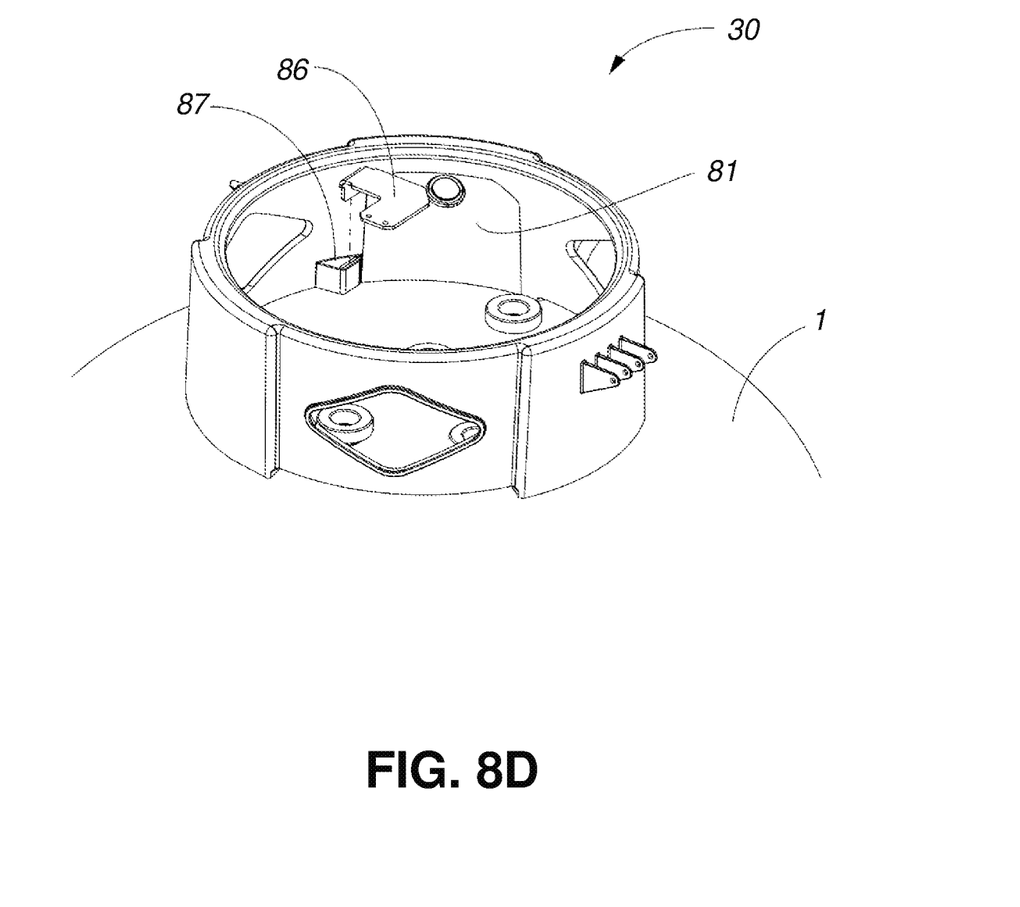
FIG. 8D is a three-dimensional side elevation view of the collar showing the regulator mounting bracket and a pocket formed in an inner wall of the collar for receiving the mounting bracket.

FIG. 8D shows the pocket 87 in more detail. The pocket 87 is formed in an inner wall of the collar 30 and comprises a slot 88 for receiving the end 86A of the regulator mounting bracket 86.

The foregoing description is merely illustrative of certain embodiments. Various modifications and substitutions can be made without departing from the scope of the invention. The scope of the invention is limited only by the claims appended hereto.

The invention claimed is:

1. A collar for mounting on a top portion of a pressurized tank, the collar comprising:
   a body for enclosing and protecting components formed or mounted on the top of the tank;
   an internal, integral fastening system for releasably attaching the collar body to the top portion of the tank;
   a lid disposed on the collar body and that actuates between an open position and a closed position, wherein the closed position protects valves and other components disposed in the top portion of the tank; and
   the collar being made of a plastic material,
   wherein the internal, integral fastening system comprises a series of slots formed in the body that each receive a respective one of a series of tabs disposed on the top portion of the tank and wherein the slots each securely engage a respective one of the tabs to lock the collar in place on the tank.

2. The collar of claim 1, further comprising a window for viewing one of the series of tabs disposed on the top portion of the tank, which tab comprises data relating to the tank.

3. The collar of claim 1, further comprising a regulator mounting member for attaching a regulator disposed on a top portion of the tank thereto.

4. The collar of claim 3, wherein the regulator mounting member is a bracket.

5. The collar of claim 1, wherein the body and the lid are made of a plastic composite material.

6. A collar for mounting on a top portion of a pressurized tank, the collar comprising:
   a body for enclosing and protecting components formed or mounted on the top of the tank;
   an internal, integral fastening system for releasably attaching the collar body to the top portion of the tank;
   a lid disposed on the collar body and that actuates between an open position and a closed position, wherein the closed position protects valves and other components disposed in the top portion of the tank;
   a regulator mounting member for attaching a regulator disposed on a top portion of the tank thereto; and
   the collar being made of a plastic material,
   wherein one end of the mounting member fits into a pocket formed in the collar and the other end is configured for mounting to the regulator by fasteners.

7. A collar for mounting on a top portion of a pressurized tank, the collar comprising:
   a body for enclosing and protecting components formed or mounted on the top of the tank; and
   a regulator mounting bracket attachable to the collar for securing a regulator of the tank in place during use,
   wherein one end of the regulator mounting bracket fits into a pocket formed in the collar and the other end is configured for mounting to the regulator by fasteners.

* * * * *